(No Model.)
G. B. PRESCOTT, Jr.
SYSTEM OF DISTRIBUTION BY SECONDARY BATTERIES.
No. 402,191. Patented Apr. 30, 1889.
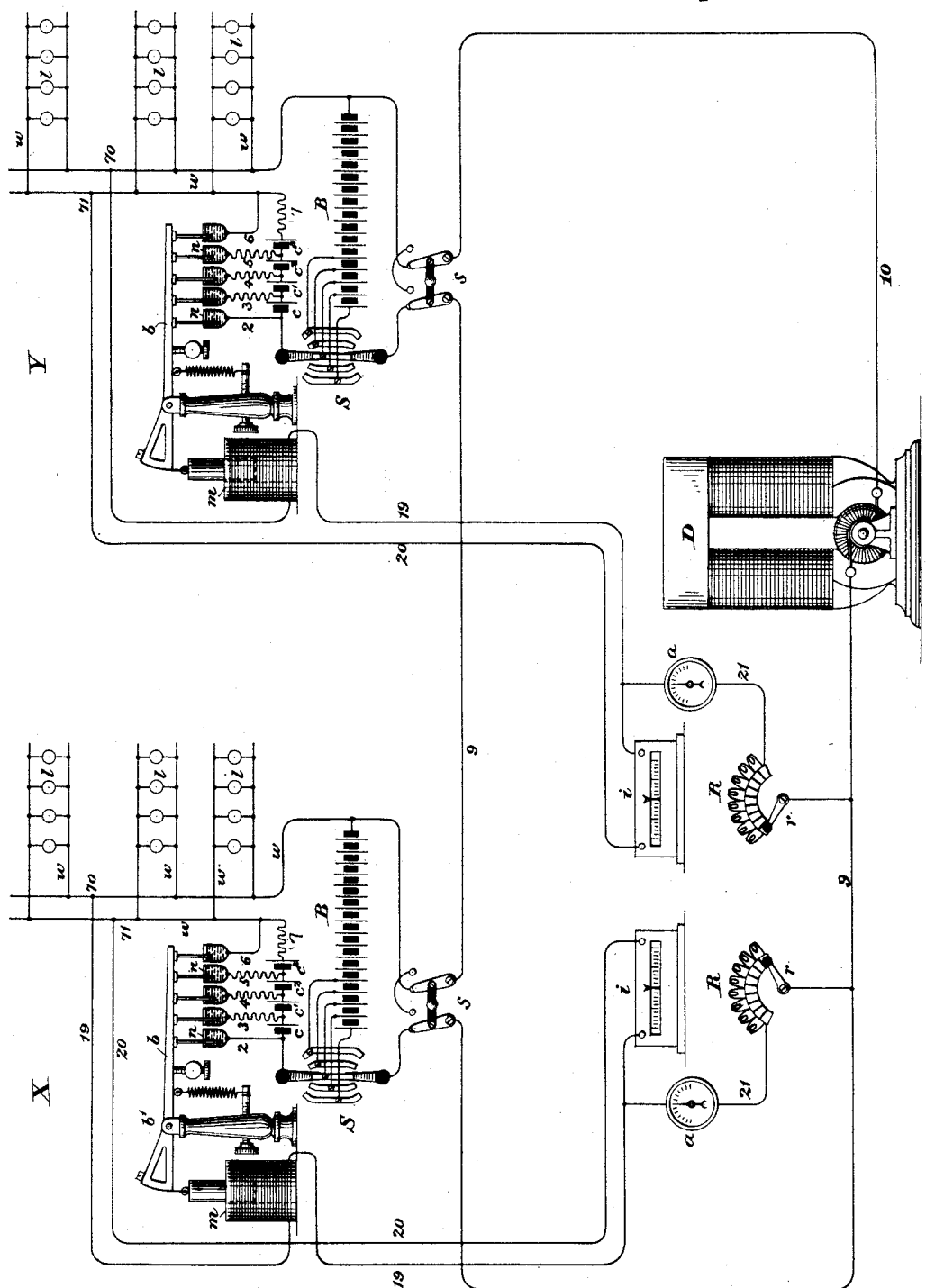
Witnesses.
Geo. W. Breck
Carrie E. Ashley
Inventor.
George B. Prescott Jr.
By his Attorney Wm. B. Vansize

UNITED STATES PATENT OFFICE.

GEORGE B. PRESCOTT, JR., OF NEWARK, NEW JERSEY, ASSIGNOR TO THE ELECTRICAL ACCUMULATOR COMPANY, OF NEW YORK.

SYSTEM OF DISTRIBUTION BY SECONDARY BATTERIES.

SPECIFICATION forming part of Letters Patent No. 402,191, dated April 30, 1889.

Application filed February 15, 1889. Serial No. 299,988. (No model.)

*To all whom it may concern:*

Be it known that I, GEORGE B. PRESCOTT, Jr., a citizen of the United States, and a resident of Newark, in the county of Essex and State of New Jersey, have invented certain new and useful Improvements in the Regulation of Electro-Motive Force in Distributing Systems Employing Secondary Batteries, of which the following is a specification.

My invention is an improvement in the regulation of electro-motive force in distributing systems employing secondary batteries.

The invention contemplates the use of a primary generator of electricity, located at a central station, and one or more sub-stations, at each of which there is located a secondary battery and a working-circuit to be supplied thereby. The main and sub stations are to be connected by two or more main leads, called the "charging-circuit." In this arrangement of apparatus, when the dynamo is being operated to charge the battery at any given station and the working-circuit is simultaneously supplied from the battery, it happens that the excessive electro-motive force necessarily employed to charge the battery is manifest and is injuriously active in the working-circuit. My invention is designed to obviate this difficulty. I connect the working-circuit at the sub-station with the central station by a circuit composed of two conductors. Located in circuit with these conductors at the central station is an indicating-instrument. In a separate circuit at the sub-station I place an electro-magnet controlling a switch for introducing or withdrawing successively a series of electrolytic cells yielding an electro-motive force the reverse of that due to the main battery. In the short circuit normally existing round these cells there is a low artificial resistance of considerable capacity useful in preventing the rapid discharge of these cells. I provide a switch at the central station for completing a third circuit between the central station and a sub-station and for varying the current flowing therein. This third circuit is practically electrically independent of the charging-circuit and of the indicator-circuit, but is composed of parts of both and includes the electro-magnet controlling the switch at the sub-station. When the indicator at the central station shows a variation from the normal electro-motive force in the working-circuit at the sub-station, I vary the resistance in the third circuit, thus operating the switch at the sub-station to change the number of electrolytic cells in opposition to the electro-motive force of the battery at the sub-station, and to thus vary the electro-motive force at the lamp-terminals.

The accompanying drawing illustrates my invention.

D is a dynamo located at a central point or station. It is connected by main leads 9 10 with sub-stations X and Y. This circuit I call the "charging-circuit." Stations X and Y are similar, and I will describe my invention by reference to one station only.

At station X there is a series of cells of secondary battery B, a switch, *s*, for including and excluding it with respect to the charging-circuit, and a regulating-switch, S, for varying the number of cells in circuit.

*w* is a working-circuit containing lamps 1, and there are a series of secondary-battery cells, $c$ $c'$ $c^2$ $c^3$, normally cut out of circuit by a switch, which when operated breaks the circuit round each cell successively, thus introducing it into the working-circuit. The series of tap-wires 2 3 4 5 6 connect points between each pair of cells with a series of fixed mercury-cups, *n*. In the circuit of tap-wires 3, 4, and 5 there are artificial resistances to provide against short-circuiting any cell, and at 7 there is a similar resistance to provide against short-circuiting the entire series of cells during the time they are cut out of circuit *w*. A bar, *b*, pivoted at *b'*, carries a series of electrical contacts—one for each mercury-cup. *m* is a solenoid electro-magnet. Its core is connected to bar *b*. Two conductors, 19 20, are joined to opposite sides of the working-circuit *w* at points 70 71, and these are united through an indicator, *i*, at the central station. The indicator *i* is practically a voltmeter, its needle standing at a central point when the electro-motive force in circuit *w* is at the normal, and moving in one direction or the other with a rise or fall of electro-motive force, as the case may be. In one side of this circuit—that is, in conductor 19—the solenoid $m$ at the sub-station is placed. At the central station there is a branch circuit, 21, for connecting indicator-circuit 19 with main lead 9, to form a third and practically independent circuit. In the branch circuit 21 is a variable artificial resistance, R, and an ammeter, $a$.

We will assume that the battery is operating to supply the lamps in the working-circuit $w$, and that indicator $i$ shows a normal electro-motive force at the points 70 71. The dynamo now begins the operation of charging battery B, and the indicator $i$ shows a rise of electro-motive force at points 70 71. The central-station attendant notices this rise of electro-motive force and proceeds to operate the circuit-changer $b$. It will be seen that magnet $m$ is in a third and separate circuit composed of conductor 21 9 D 10, through station Y 9 $w$ at X, to point 70 19 $m$, ammeter $a$, and resistance R. By moving arm $r$ to the left the artificial resistance in this circuit is decreased and the strength of current is increased. The core of $m$ is drawn down until the short circuit through the mercury-cup and tap-wires 5 and 6 is broken. This admits cell $c^3$ into the working-circuit $w$. It opposes its electro-motive force of, say, two volts to that of the battery. This is immediately evident on the indicating-instrument $i$. If it is insufficient to reduce the electro-motive force to its normal, the strength of current flowing in the described third circuit is still further increased by decreasing resistance at R until a second cell, $c^2$, is included in the working-circuit $w$, reversed with respect to battery B, and this operation is continued until a sufficient counter electro-motive force is operative in the working-circuit to neutralize the excess in electro-motive force appearing at the lamp-terminals. It is to be noticed that when cell $c^3$ is introduced into working-circuit $w$ the artificial resistance in the tap-wire 5 and the artificial resistance at 7 are also included in series, and serve to cause a slight additional drop in electro-motive force to that produced by the counter electro-motive force of cell $c^3$; but this resistance is mainly to avoid an excessively-rapid discharge when the counter-electro-motive-force cells are removed from the working-circuit. So, too, when cell $c^2$ is added to circuit $w$, the resistances 4 and 7 are included.

What I claim, and desire to secure by Letters Patent, is—

1. The combination of a primary generator of electricity located at a main station, a charging-circuit, a secondary battery located at a sub-station, a working-circuit therefor, one or more cells yielding a counter electro-motive force to be introduced and withdrawn with respect to the working-circuit, a switch or circuit-changer controlling the position of said cells, an electro-magnet for operating the switch, and a separate circuit connecting the main and sub stations, including the coils of said magnet.

2. The combination of a primary generator of electricity located at one station, a secondary battery located at a second station, a charging-circuit uniting both stations, a working-circuit for the battery, one or more cells yielding a counter electro-motive force to be inserted and withdrawn with respect to the working-circuit, a circuit connecting points in the working-circuit at one station with an indicator at the other station, and an electro-magnetic switch at the sub-station having its coils in an electrical circuit uniting both stations, substantially as described.

3. The combination of a primary generator of electricity located at one station, a secondary battery located at a second station, a charging-circuit uniting said stations, a working-circuit for the battery, one or more cells yielding a counter electro-motive force to be inserted and withdrawn with respect to the working-circuit, a circuit connecting points in the working-circuit at one station with an indicator at the other station, an electro-magnetic switch at the sub-station controlling the counter-electro-motive-force cells, and an electrically-independent circuit uniting both stations and controlling the electro-magnetic switch, substantially as described.

4. The combination of a primary generator of electricity located at one station, a secondary battery located at a second station, a charging-circuit uniting said stations, a working-circuit for the battery at said second station, a series of cells yielding a counter electro-motive force, a switch or circuit-changer for varying the connections of said cells with respect to the working-circuit, an electro-magnet controlling said switch, a separate circuit containing the coils of said magnet, and a third circuit connecting points in the working-circuit with an indicator located at the first station, substantially as described.

5. The combination of a primary generator of electricity located at a main station, a secondary battery located at a sub-station, a charging-circuit uniting both stations, a working-circuit for the secondary battery, a series of artificial resistances and one or more cells yielding a counter electro-motive force to be inserted and withdrawn with respect to the working-circuit, a switch or circuit-changer controlling the position of said cells, an electro-magnet for operating the switch, and a separate circuit connecting the main and sub stations, including the coils of said magnet.

6. The combination of a secondary battery, a working-circuit therefor, a series of cells yielding a counter electro-motive force, and a switch or circuit-changer for introducing one cell after another between the battery and working-circuit, substantially as described.

7. The combination of a secondary battery, a working-circuit therefor, a series of cells yielding a counter electro-motive force, located in the working-circuit, a circuit containing an artificial resistance around each cell, and a switch or circuit-changer operating to break the circuit of each cell successively, substantially as described.

8. The combination of a secondary battery, a working-circuit therefor, a series of cells yielding a counter electro-motive force, located in the working-circuit, a sectional artificial resistance for such cells included in circuit therewith, and a switch or circuit-changer normally completing a circuit round each cell, including a resistance and means for breaking such circuits successively to introduce said cells and resistance with respect to the working-circuit, substantially as described.

GEO. B. PRESCOTT, JR.

Witnesses:
V. E. SCHAUMBURG,
F. D. L. WALKER.